United States Patent
Yahashi et al.

(10) Patent No.: US 6,853,458 B2
(45) Date of Patent: Feb. 8, 2005

(54) THREE-DIMENSIONAL MEASURING METHOD AND DEVICE, AND COMPUTER PROGRAM

(75) Inventors: Akira Yahashi, Kobe (JP); Tetsuya Katagiri, Kyoto (JP); Fumiya Yagi, Toyonaka (JP); Hiroshi Uchino, Kyoto (JP); Yuzuru Tanaka, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 158 days.

(21) Appl. No.: 10/209,641

(22) Filed: Aug. 1, 2002

(65) Prior Publication Data

US 2003/0026475 A1 Feb. 6, 2003

(30) Foreign Application Priority Data

Aug. 1, 2001 (JP) ........................................ 2001-233264

(51) Int. Cl.⁷ .............................. G01B 11/24; G06K 9/00
(52) U.S. Cl. ........................ 356/604; 356/625; 382/154
(58) Field of Search .............................. 356/601–625; 382/106–108, 152–154; 250/237.2, 559.22, 559.23

(56) References Cited

U.S. PATENT DOCUMENTS

| 4,846,577 | A | * | 7/1989 | Grindon ..................... 356/610 |
|---|---|---|---|---|
| 5,675,407 | A | | 10/1997 | Geng |
| 6,028,672 | A | | 2/2000 | Geng |
| 6,256,099 | B1 | * | 7/2001 | Kaufman et al. ............ 356/603 |
| 6,341,016 | B1 | * | 1/2002 | Malione ..................... 356/603 |
| 6,369,899 | B1 | * | 4/2002 | Hamada ..................... 356/603 |
| 6,549,288 | B1 | * | 4/2003 | Migdal et al. ............... 356/603 |
| 6,640,004 | B2 | * | 10/2003 | Katayama et al. .......... 382/154 |

FOREIGN PATENT DOCUMENTS

| JP | 61-075210 | | 4/1986 | |
| JP | 04052509 A | * | 2/1992 | .......... G01B/21/24 |

* cited by examiner

*Primary Examiner*—Gregory J. Toatley, Jr.
*Assistant Examiner*—Sang H. Nguyen
(74) *Attorney, Agent, or Firm*—McDermott Will & Emery LLP

(57) ABSTRACT

In order to reproduce a three-dimensional shape of an object accurately while maintaining measuring accuracy and high speed, in a three-dimensional measuring method of projecting a stripe pattern having colored stripes on the object and measuring the three-dimensional shape of the object based on stripe positions on the imaged image corresponding to the stripes on the stripe pattern, colors of the stripes on the stripe pattern are set according to a predetermined rule, and a plurality of stripes having a predetermined positional relationship are extracted from the image, and correspondence with stripes on the stripe pattern based on the color arrangement of the extracted plural stripes.

14 Claims, 14 Drawing Sheets

| color of stripe | basic colors composing stripes | light quantity ratio |
|---|---|---|
| R | R | 1 |
| G | G | 2 |
| B | B | 1 |
| C | G , B | 3 |
| M | R , B | 2 |
| Y | R , G | 3 |
| W | R , G , B | 4 |

Fig.10

| G | B | G | B |
|---|---|---|---|
| R | G | R | G |
| G | B | G | B |
| R | G | R | G |

Bayer arrangement

Fig.12

| color of stripe | basic colors composing stripes | | | light quantity ratio |
|---|---|---|---|---|
| R | R | | | × |
| G | | G | | ○ |
| B | | | B | × |
| C | | G | B | ○ |
| M | R | | B | × |
| Y | R | G | | ○ |
| W | R | G | B | ○ |

Fig.13

THREE-DIMENSIONAL MEASURING METHOD AND DEVICE, AND COMPUTER PROGRAM

This application is based on application No. JP 2001-233264 filed in Japan, the content of which is hereby incorporated by reference.

BACKGROUND OF THE INVENTION

1. Field of the Invention

The present invention relates to an improved three-dimensional measuring method. More concretely, the invention relates to improved pattern projection-type three-dimensional measuring method and device, and a computer program. Particularly, the invention relates to a method of making stripes of a stripe pattern on a pattern mask correspond to stripes on a projected image.

2. Description of the Related Art

As a method of three-dimensionally measuring an object with a high speed, a method of projecting a stripe pattern onto the object is known. In this method, a stripe pattern is projected on an object and is photographed, and a three-dimensional shape of the object is obtained from a deformed state of the stripe pattern on the obtained image. As the stripe pattern, stripes having light quantity distribution (density distribution) of a sinusoid are normally used, and their phase shift is utilized.

This method has two problems. One is that it is difficult to heighten resolution (measuring accuracy). In order to heighten the resolution, gaps between the stripes in the stripe pattern may be narrowed. However, since the pixel density of an imaging device has a limitation, if the gaps between the stripes are narrowed much, a phase detecting ability is deteriorated due to a rounding error caused by digitization.

The other problem is that it is difficult to make projected stripes correspond to stripes on an image because the stripe pattern is a repeated pattern. If the correspondence is made improperly, when a shape of the object is reproduced, greatly incorrect result is obtained. When the gaps between the stripes are widened, the correspondence becomes easy, but the resolution is deteriorated, namely, a trade-off relationship is established.

In order to solve these problems, there suggests a method of projecting a stripe pattern onto an object with phases being different, and obtaining a three-dimensional shape based on photographed images with the respective phases. Normally, the phases are shifted by 90° and the objects are photographed four times so that four images are obtained and are analyzed. This is known as a phase shift-type stripe pattern projecting method.

According to this method, the resolution can be heightened without narrowing the gaps between the stripes, but there is a disadvantage that it takes a long time to shift the phases stably. Moreover, the problem that the correspondence of the stripes is difficult still remains.

There is a method using a color stripe pattern instead of a monochrome stripe pattern.

One of these approaches, there is a method of projecting a spectrum-type stripe pattern, a wavelength of which changes successively, and in this method, colors have one to one correspondence to angles of projection.

For example, there suggests a three-dimensional measuring device for projecting a spectrum pattern on to an object and imaging an image as a multi-band color image (Japanese Patent Publication No 3-52001 (1991)). This device codes an angle of projection by means of a wavelength, and a projection pattern changes continuously according to an arrangement of wavelengths.

However, this method requires a spectrometer for generating a spectral pattern which covers a predetermined range in a projection system. Moreover, since a fine difference in color should be discriminated in light receiving system, an accurate color reading device is required to heighten the resolution sufficiently.

In addition, there suggests a method of projecting a repeated pattern of stripes having three colors R, G and B. However, because it is three-color repeated pattern, positions of stripes cannot be specified only by the colors on the stripes. For this reason it is necessary to count from a reference stripe having different color from the three colors to an objective stripe. However, in the case where discontinuous of stripes exists due to unevenness of the surface of the object a number of stripes cannot be counted properly.

OBJECTS AND SUMMARY

The present invention is made in order to solve the above problems, and an object is to provide an improved three dimensional measuring method. Particularly, the object is to provide an improved pattern projection-type three-dimensional measuring method. More concretely, the object is to provide three-dimensional measuring method and device, which are capable of reproducing a three-dimensional shape of an object accurately while maintaining accuracy and high speed of measurement.

In order to achieve the above object and another objects, a three-dimensional measuring method from an aspect of the present invention of projecting a stripe pattern having colored stripes on an object and measuring a three-dimensional shape of the object based on positions of the stripes on the imaged image corresponding to the stripes on the stripe pattern, wherein colors of the stripes on the stripe pattern are set according to a predetermined rule, a plurality of stripes having a predetermined positional relationship is extracted from the image, and correspondence with the stripes on the stripe pattern based on a color arrangement of the extracted plural stripes.

In another aspect, the colors of the stripes are set so that the same color pattern made of a plural predetermined number of stripes is not repeated in a group composed of all or some of the stripes included in the stripe pattern, a predetermined number of stripes are extracted from the image, and correspondence with the stripes on the stripe pattern based on a color pattern composed of the extracted stripes.

Further, a three-dimensional measuring device from an aspect of the present invention projects a stripe pattern having colored stripes on an object and measuring a three-dimensional shape of the object based on positions of the stripes on the imaged image corresponding to the stripes on the stripe pattern, wherein the colors of the stripes on the stripe pattern are set so that the same color pattern composed of a predetermined number of stripes is not repeated in a group composed of all or some of the stripes included in the stripe pattern. The three-dimensional measuring device has a color pattern storage section in which information about the color pattern is stored, a stripe extracting section for extracting a predetermined number of stripes from the image, a corresponding section for referring to the color pattern stored in the color pattern storage section and obtaining correspondence with the stripes on the stripe pattern based on a predetermined number of the extracted stripes.

Furthermore, the device has a color image sensor which is capable of discriminating the colors, and an image pick-up device for imaging the object on which the stripe pattern has been projected.

As the colors of the stripes, colors which can be reproduced by combining three primary colors of the color image sensor. In another aspect, as the colors of the stripes, five colors: green; cyan; magenta; yellow; and white are used. In still another aspect, as the colors of the stripes, colors including a color as a component having the highest pixel density are used. In another aspect, the color pattern is formed by three stripes which are arranged continuously.

In addition, in order to achieve the above object and another objects, a stripe pattern device in an aspect of the present invention which is used for projecting a stripe pattern having colored stripes on an object and measuring a three-dimensional shape of the object based on positions of the stripes on the imaged image corresponding to the stripes on the stripe pattern, wherein the colors of the stripes in the stripe pattern formed in the stripe pattern device are set so that the same color pattern composed of a predetermined number of stripes is not repeated in a group composed of all or some of the stripes.

Further, in order to achieve the above object and another objects, a computer program from an aspect of the present invention which is used for projecting a stripe pattern where colors of stripes are set so that the same color pattern having a predetermined number of stripes is not repeated onto an object and measuring a three-dimensional shape of the object based on positions of the stripes on the imaged image, wherein a computer executes a process for extracting a predetermined number of stripes from the image, and a process for referring to information about the color pattern and obtaining correspondence between the extracted stripes and stripes on the stripe pattern based on the color pattern composed of a predetermined number of the extracted stripes.

BRIEF DESCRIPTION OF THE DRAWINGS

These and other objects and features of the present invention will become apparent from the following description of preferred embodiments thereof taken in conjunction with the accompanying drawings, in which:

FIG. 10 is a diagram showing a light quantity ratio of seven colors;

FIG. 12 is a diagram showing a Bayer arrangement;

FIG. 13 is a diagram showing existence/nonexistence of G component in seven colors.

In the following description, like parts are designated by like reference numbers throughout the several drawing.

DETAILED DESCRIPTION OF THE PREFERRED EMBODIMENTS

First Embodiment

Figure 1:
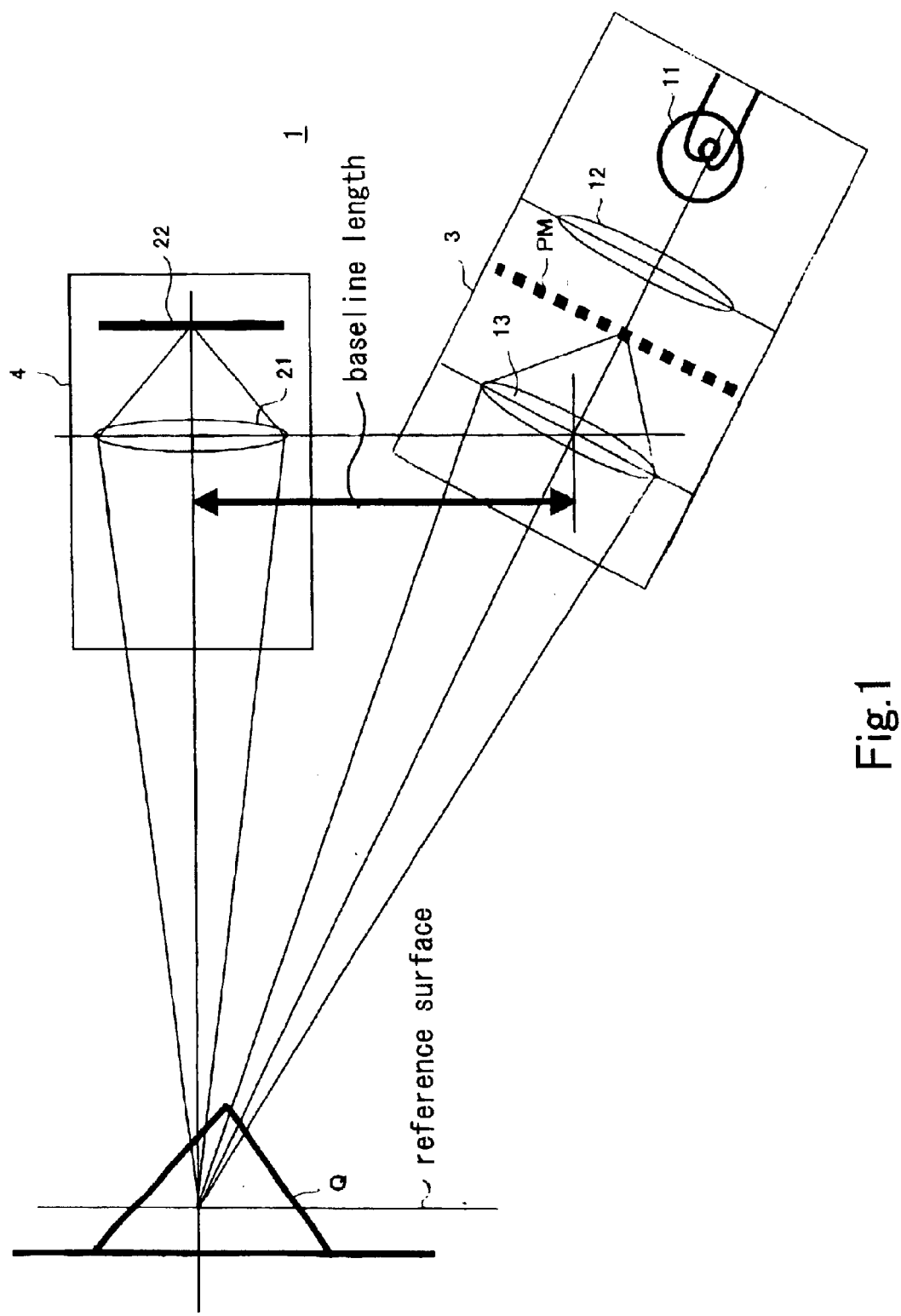
FIG. 1 is a diagram showing a structure of an optical system of a three-dimensional measuring device according to the present invention.
Figure 2:
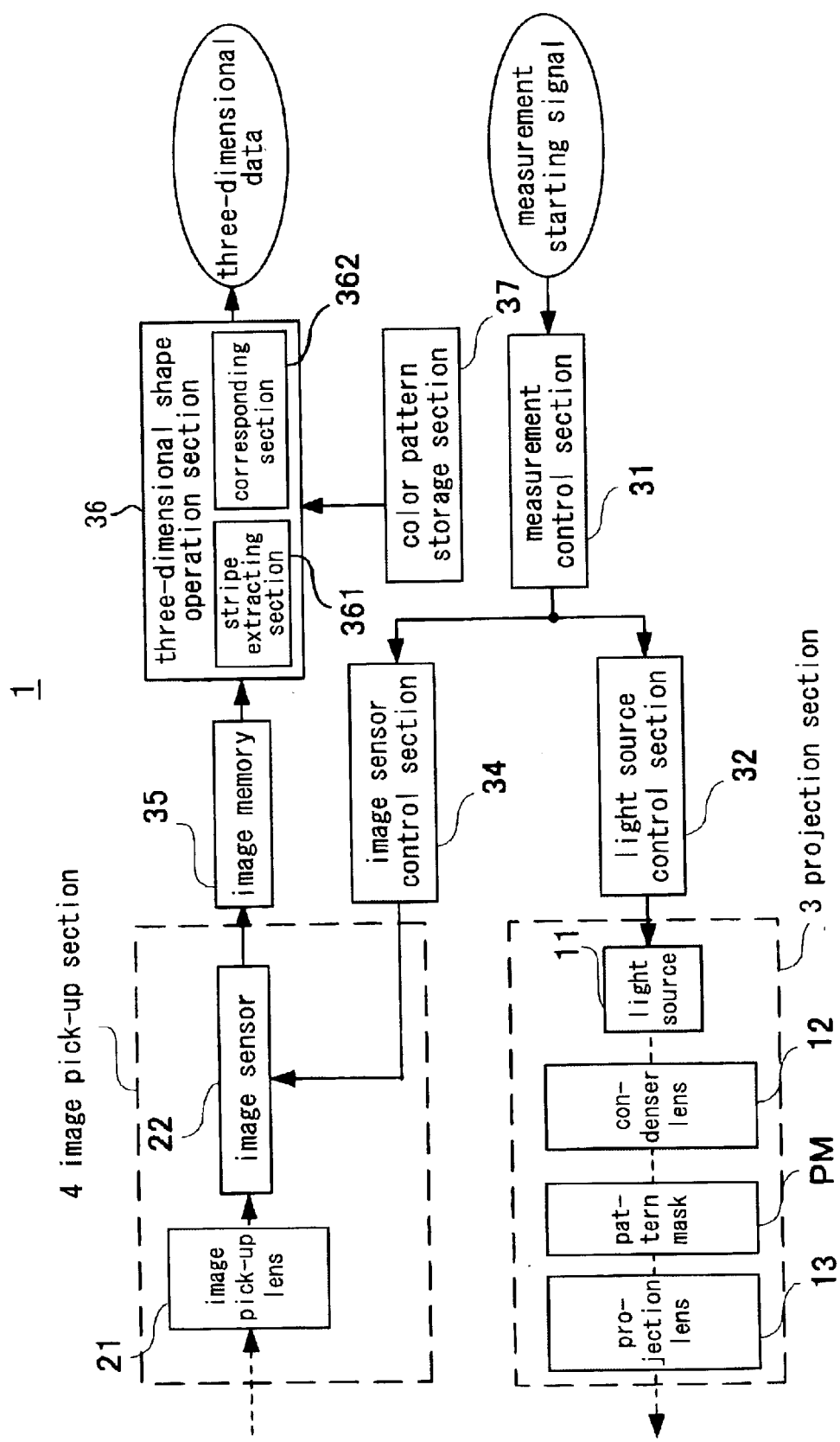
FIG. 2 is a block diagram showing an entire structure of the three-dimensional measuring device.

FIG. 1 is a diagram showing a structure of an optical system of a three-dimensional measuring device 1 according to the present invention, and FIG. 2 is a block diagram showing an entire structure of the three-dimensional measuring device.

As shown in FIGS. 1 and 2, the three-dimensional measuring device 1 is provided with a projection section 3 and an image pick-up section 4.

The projection section 3 is provided with a light source 11, a condenser lens 12, a projection lens 13, a pattern mask PM and the like. The light source 11 is a flash light source for emitting a white light. The condenser lens 12 condenses the light emitted from the light source 11.

The pattern mask PM is formed into an oblong shape by a material such as synthetic resin or glass. A stripe pattern SP having colored stripes are formed on the pattern mask PM. In the stripe pattern SP, colors of the respective stripes are coded to be set so that one color pattern composed of plural predetermined numbers of stripes is not repeated. The light of the light source 11 selectively transmits according to colors of the stripe pattern SP (spectral transmittance distribution). It will be described about stripe pattern SP in the following.

The image pick-up section 4 is provided with an image pick-up lens 21, an image sensor 22 and the like. The image sensor 22 is composed of an aggregation of three pixels of R (Red), G (Green) and B (Blue), and a stripe pattern which is projected onto a surface of an object Q is color-separated into three colors and converted into an electric signal to be photographed (imaged). Namely, information of the three-colored pixels is combined so that a color image is formed. The focus is taken on the surface of the object Q by the image pick-up lens 21. The surface of the image pick-up section 4 where the focus is taken the most effectively is a reference surface.

The projection section 3 and the image pick-up section 4 are arranged and fixed so that a main point position of the image pick-up lens 21 and a main point position of the projection lens 13 are separated by a predetermined distance (a baseline length). An optical axis of the projection section 3 is arranged so as to cross an optical axis of the image pick-up section 4 on the reference surface. An adjustment is made so that the focus of the stripe pattern becomes the best in the position where the optical axes cross. The object Q is arranged in a vicinity of the position where the optical axes cross.

As shown in FIG. 2, the three-dimensional measuring device 1 is provided with a measurement control section 31, a light source control section 32, an image sensor control section 34, an image memory 35, a three-dimensional shape operation section 36 and a color pattern storage section 37 as well as the projection section 3 and the image pick-up section 4.

The measurement control section 31 controls the light source control section 32 and the image sensor control section 34 so that the object Q is measured three-dimensionally based on a measurement starting signal.

The light source control section 32 allows the light source 11 to emit a light with predetermined timing and predetermined intensity based on the signal from the measurement control section 31. The image sensor control section 34 controls driving of the image sensor 22 based on the signal from the measurement control section 31.

The image sensor 22 photographs an image in synchronization with the light emission of the light source 11 based on the signal from the image sensor control section 34. The image memory 35 stores information of an image (stripe pattern image) obtained by photographing of the image sensor 22. The color pattern storage section 37 stores a stripe color arrangement (color pattern) of the stripe pattern SP.

The three-dimensional shape operation-section 36 calculates a three-dimensional shape of the object Q using the image information stored in the image memory 35 with reference to the information about the color pattern stored in the color pattern storage section 37 to output a calculated result.

Namely, the three-dimensional shape operation section 36 is provided with a stripe extracting section 361, a corresponding section 362, a coordinate detecting section, a projecting position detecting section, a light receiving position detecting section, a three-dimensional operation section, not shown.

The stripe extracting section 361 extracts a predetermined number of stripes from the image stored in the image memory 35. When the stripes are extracted, a part of the each stripe, for example, one point of each stripe may be extracted. Colors of the extracted stripes are judged.

The corresponding section 362 refers to the color pattern stored in the color pattern storage section 37 and obtain correspondence with the stripes of the stripe pattern SP on the pattern mask PM based on the color pattern due to a predetermined number of the extracted stripes. Namely, the stripes which have been coded and projected by the stripe pattern SP are decoded.

The process in the three-dimensional shape operation section 36 is realized by a hardware, a software or a combination of them. In order to realize the process using a software, a recording medium in which a suitable program has been stored, a CPU and the like may be used. The program is executed by the CPU so that the stripe extracting section 361, the corresponding section 362 and the like can be realized.

As the three-dimensional shape operation section 36, a personal computer, a work station and the like including the image memory 35 can be used. The above-mentioned-program data can be supplied by using a CD-ROM, a floppy disk, a magneto-optical disk, a semiconductor memory such as a compact flash and the other recording mediums. A suitable drive device is used according to types of the recording medium. Moreover, the program can be obtained by receiving it via a network. In the case where a personal computer or the like is used, only the projection section 3 and the image pick-up section 4 compose one measuring device, and this device may be separated from the personal computer.

In the three-dimensional measuring device 1, the entire structure except that the arrangement of the stripe pattern SP on the pattern mask PM and the method of correspondence of stripes by means of a color pattern has been known conventionally. Moreover, as the method of operating a three-dimensional shape based on the image stored in the image memory 35, various operation means which have been known conventionally can be used. For example, see "Optically three-dimensional measurement" written by Yoshizawa Thoru, published by New Technology Communications, December 1998, Second Edition, 83 pp. and thereafter.

Next, there will be explained below the method of correspondence between the pattern mask PM and stripes.

Figure 3:
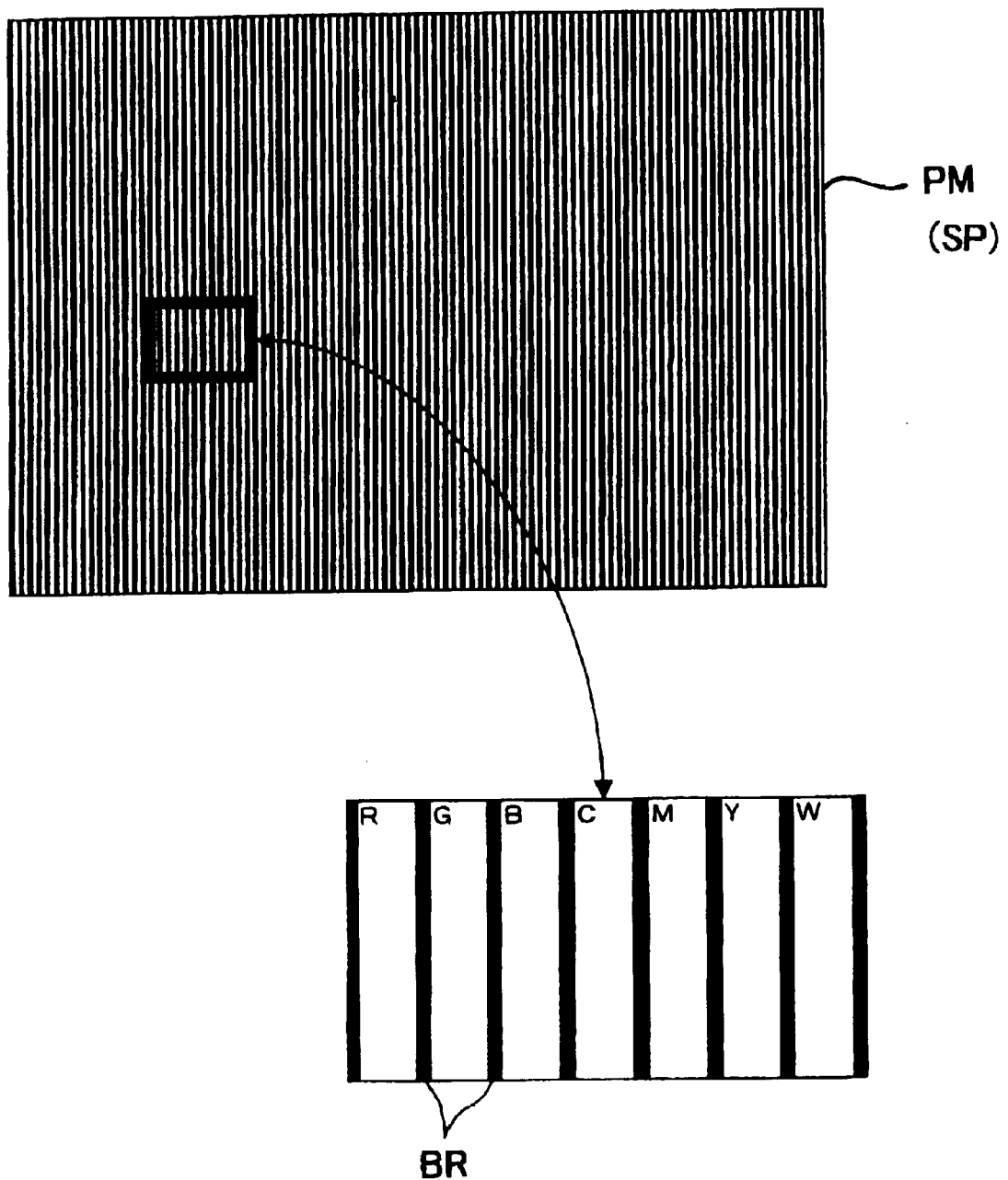
FIG. 3 is a front view of a pattern mask.
Figure 4:
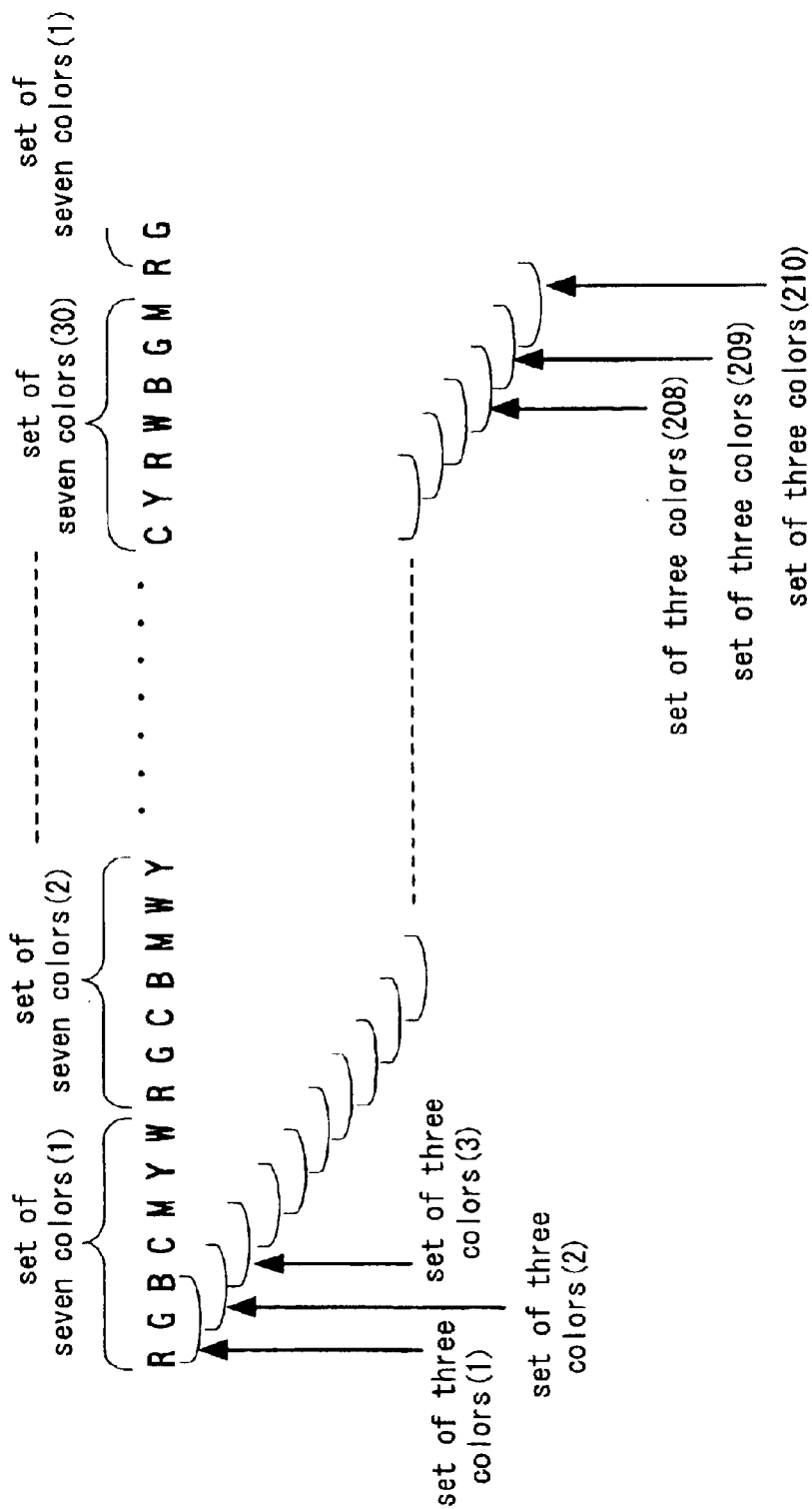
FIG. 4 is a diagram showing an example of a color array of a stripe pattern.

FIG. 3 is a front view of the pattern mask PM, and FIG. 4 is a diagram showing an example of a color arrangement of the stripe pattern SP.

As shown in FIG. 3, a lot of linear stripes are arranged on the pattern mask PM with uniform gaps. The gaps between the stripes are uniform, and the gap between the adjacent stripes corresponds to a several pixels on the image sensor 22 when the stripe pattern projected on the object is photographed. A boundary section between a stripe SA and a stripe SA is provided with a black separator BR.

A colors which is selected from seven colors composed of a combination of R, G and B is given to each stripes SA. Namely, when the three colors R, G and B are combined, seven colors R, G, B, C (cyan), M (magenta), Y (yellow) and W (white) are obtained. The color of each stripe is one of the seven colors. BK (black) can be obtained by a combination of R, G and B, but since it does not have a signal value, it is excluded.

As shown in FIG. 4, a number of the arrangements in the case where arbitrary three colors are taken from the seven colors is 210 (=7×6×5). 30 sets of stripes where each set has seven colored stripes, namely, 210 stripes in total are arranged and a color arrangement in each set is devised. Namely, the 210 arrangements of three-colored stripes are devised so that while the colors are shifted one by one so that the 210 stripes are suitably arranged, and continuous three stripes which have the same color appear only once.

Figure 5:
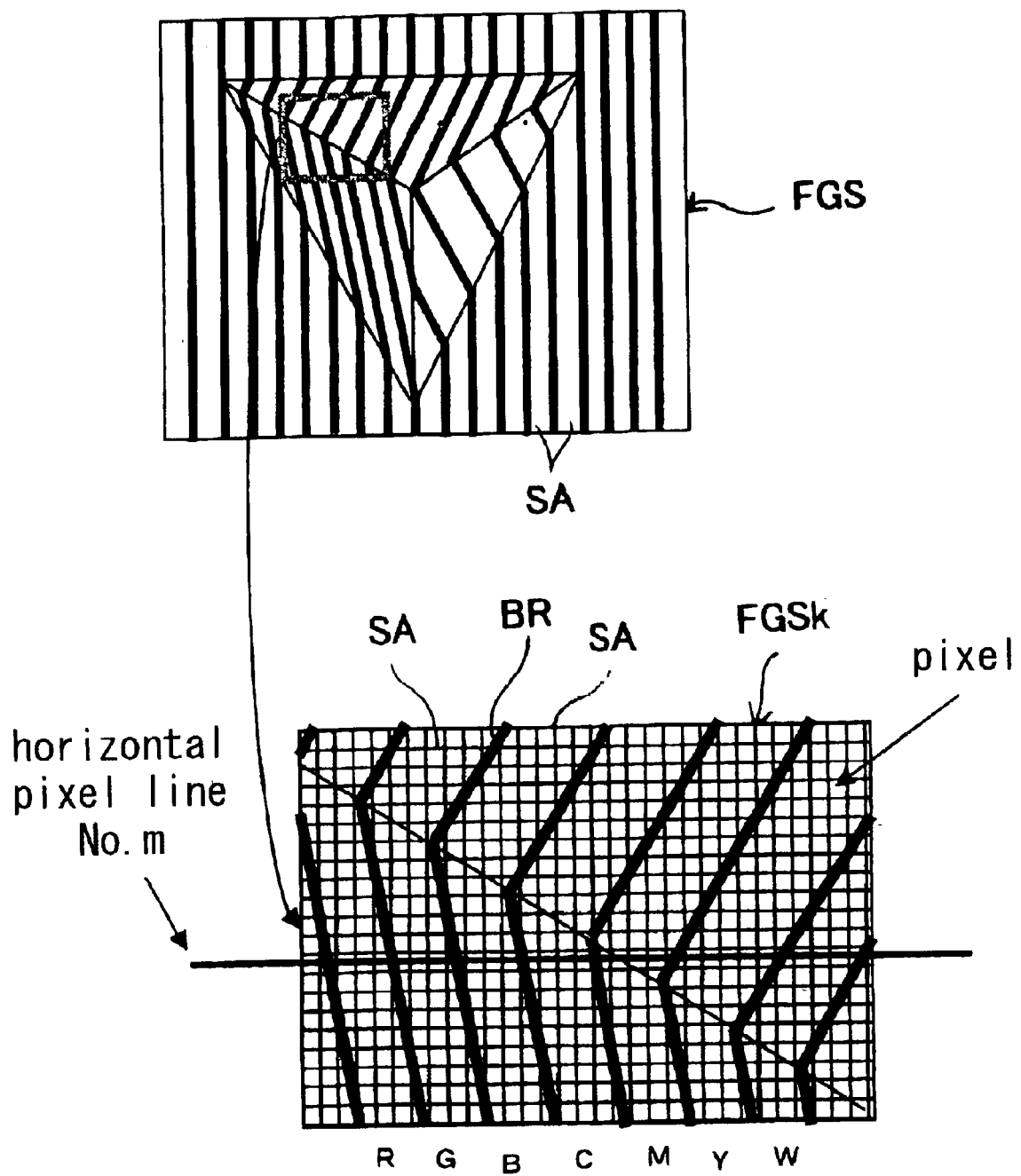
FIG. 5 is a diagram showing an example of a photographed stripe pattern image and its enlarged part.
Figure 6:
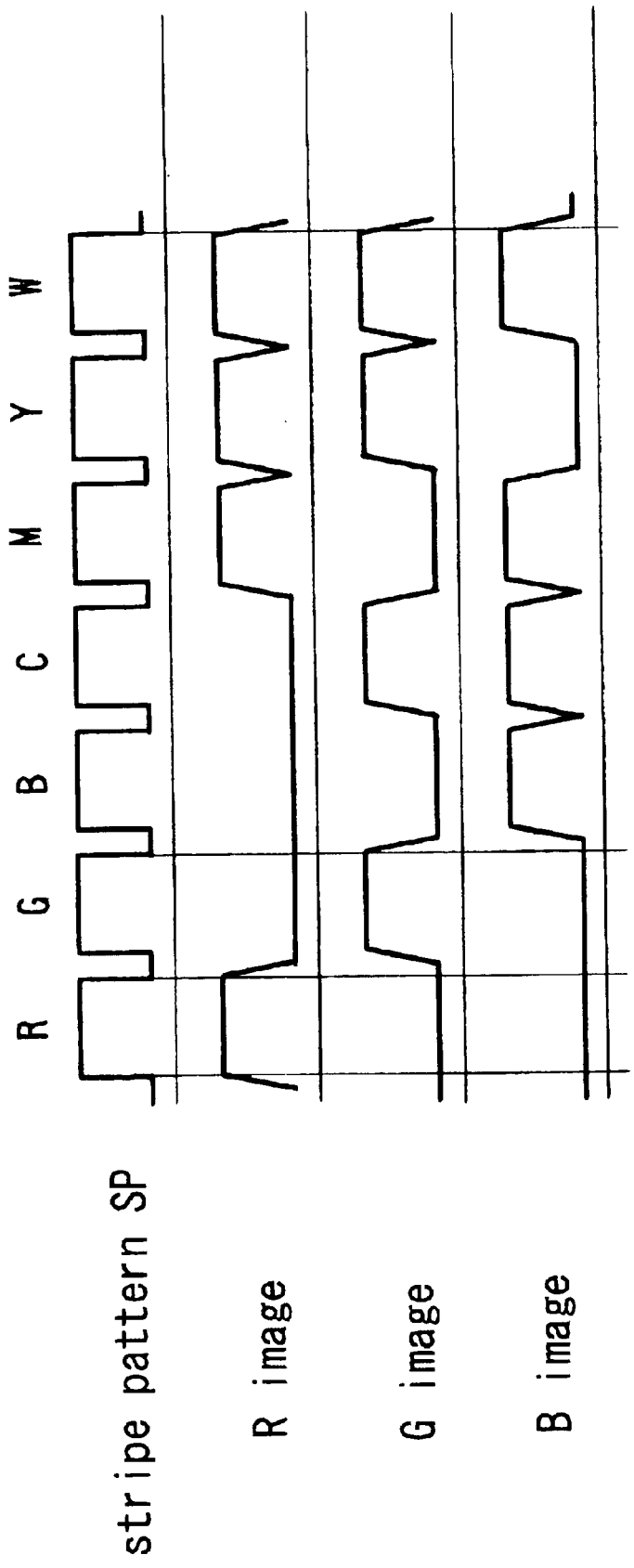
FIG. 6 is a diagram explaining a color detecting method.

FIG. 5 is a diagram showing an example of a photographed stripe pattern image FGS and its enlarged portion, and FIG. 6 is a diagram which explains a color detecting method. FIGS. 7A through 7D are diagrams respectively showing barycentric positions of the stripes of the stripe pattern image FGS, and FIG. 8 is a diagram showing a state that the barycentric positions on a horizontal pixel line of the stripe pattern image FGS are detected.

In FIG. 5, the object Q has a portion which is provided at the center and protrudes to a front side of a triangular pyramid. The enlarged stripe pattern image FGSk shows a vicinity of one ridgeline of the triangular pyramid. The stripe pattern image FGS is constituted so that a lot of stripes SA sandwich the separator BR. The stripe SA deforms according to a shape of the object Q. One square shows a pixel.

In FIG. 6, a sectional waveform of the stripe pattern SP is rectangular, An output waveform of the image sensor 22 has a trapezoidal shape in which its bottom is broadened due to a limit of the resolution of the image pick-up lens 21. In an R image of the images output by the image sensor 22, only four-colored stripes R, M, Y and W become data. Similarly, in G, C, Y, W and R images, only four-colored stripes R, C, M and W become data.

Figure 7:
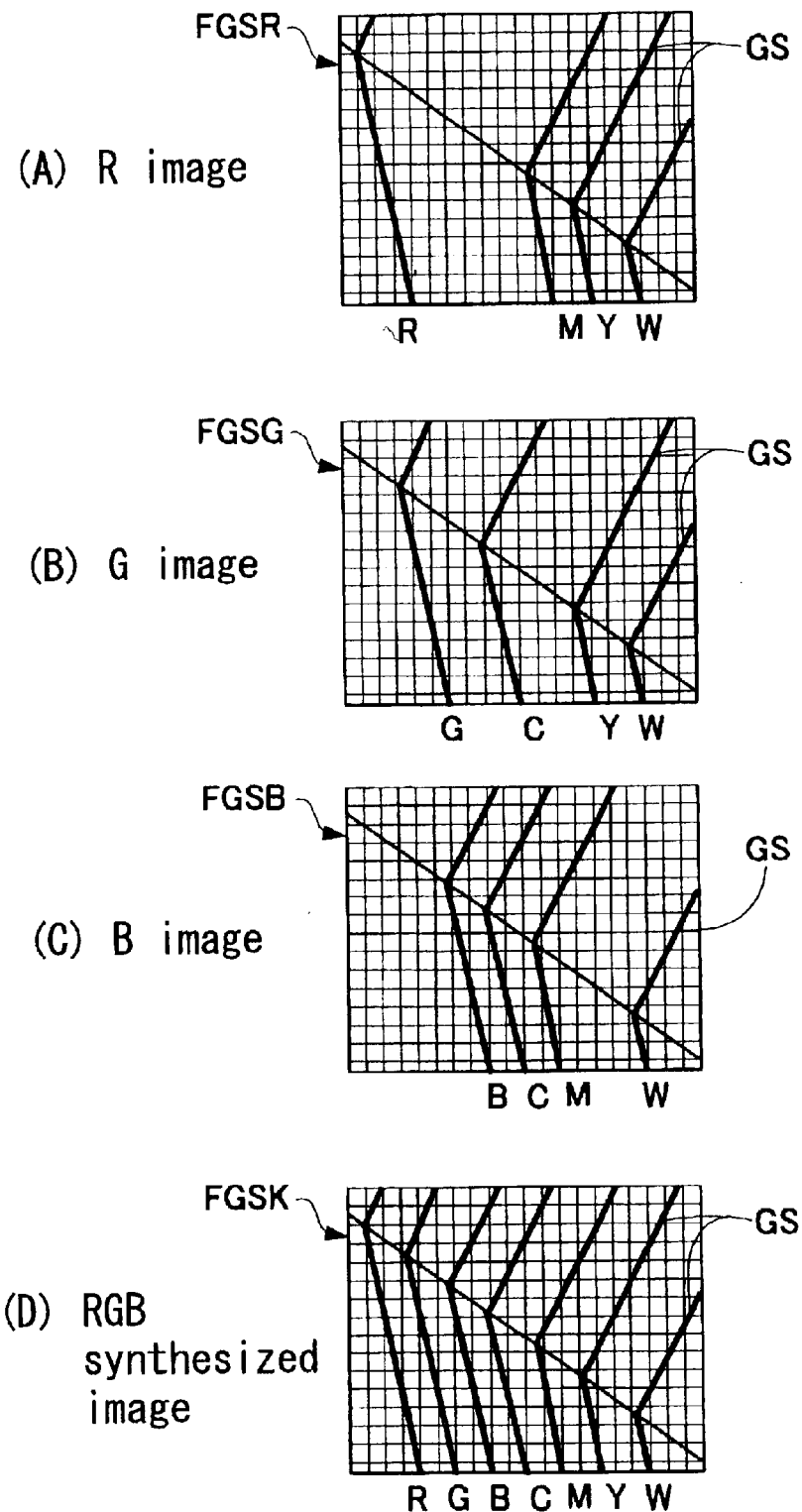
FIGS. 7A through 7D are diagrams showing barycentric positions of the respective stripes of the stripe pattern image.
Figure 8:
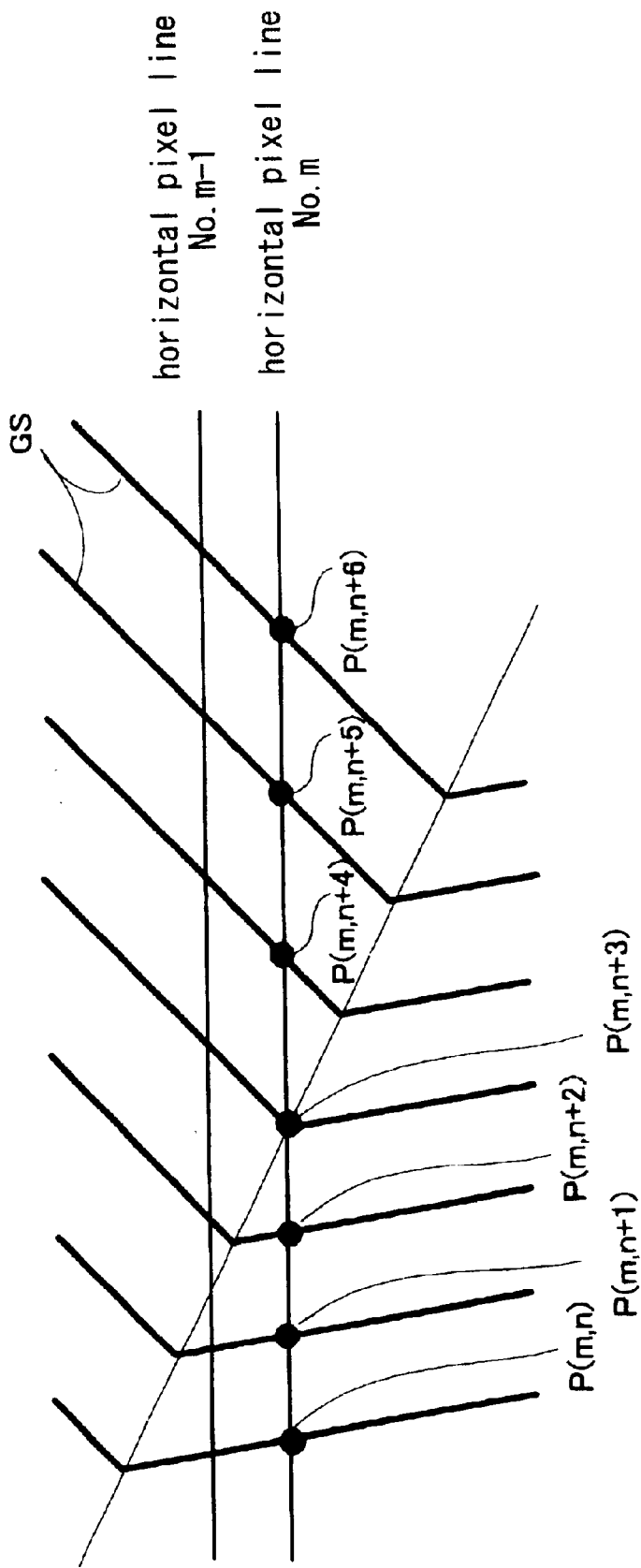
FIG. 8 is a diagram showing a state that barycentric positions of the stripe pattern image on a horizontal pixel line are detected.

The R image shown in FIG. 7(A) is composed of the four-colored stripes R, M, Y and W, but The barycentric positions GS of the respective stripes are shown by a line. Similarly in FIGS. 7(B) and 7(C), the barycentric positions GS of the respective colored stripes are shown by a line in the G and B images. In FIG. 7(D), the barycentric positions GS of the colored stripes in a RGB synthesized image obtained by adding the R, G and B images for each pixel are shown by a line. The all colored stripes are original data in the RGB synthesized image.

In the RGB synthesized image (stripe pattern image FGS) shown in FIG. 7(D), a signal intensity distribution of a section is created for each horizontal pixel line composed of pixels arranged in one row in a horizontal direction (see FIG. 8). A signal value changes due to existence of the stripe pattern in the section. A barycentric positions which are respective peak positions of the signal value are obtained so that coordinate information about the barycentric positions GS arranged in the direction of the horizontal pixel line can be obtained. The coordinate positions can be obtained in a unit smaller than one pixel unit, namely, with higher resolution than a pixel pitch by an interpolating operation. This is repeated for all the horizontal pixel lines.

In FIG. 8, numbers 1, 2, 3 . . . m–1, m . . . (coordinates) are given to the horizontal pixel lines from the top. On the horizontal pixel lines, numbers 1, 2, 3 . . . n–1, n . . . are given to the points (barycentric position points) on the respective stripe barycentric positions GS from the left. The barycentric positions P of the respective stripes are specified by m and n. Moreover, the coordinate positions of the respective barycentric position points P are obtained as mentioned above.

At the barycentric position points P on the respective horizontal pixel line, values of the RGB images are compared with each other, so that colors of the stripes at the barycentric position points P can be clear. This is repeated for all the horizontal pixel lines, so that the colors of the stripes can be made to correspond to all the barycentric position points P.

Further, color information about the barycentric position points P which are adjacent light and left on the same horizontal pixel line is clear for each barycentric position point P. An arrangement of colors of three points (stripes) composed of a target barycentric position point P and the barycentric position points P adjacent right and left to the target point P can be obtained.

For example, the barycentric position point P (m, n+3) is "C, adjacent left to B and adjacent right to M". The barycentric position point P (m, n+4) is "M, adjacent left to C and adjacent right to Y".

When such a color arrangement is compared with the color pattern stored in the color pattern storage section 37, the positional correspondence between the stripes on the image sensor 22 and the stripes on the pattern mask PM.

As for the barycentric position points P obtained in such a manner, a conditional equation of a light receiving direction is obtained from the coordinate positions thereof, so that a conditional equation of a projection direction of the stripes on the pattern mask PM corresponding to the barycentric position points P is obtained. The positions of projection point and the light receiving point are obtained according to the conditional equations, and the three-dimensional positions of the points on the object Q are calculated.

There will be explained below a flow of the process of the three-dimensional measuring method with reference to a flowchart.

Figure 9:
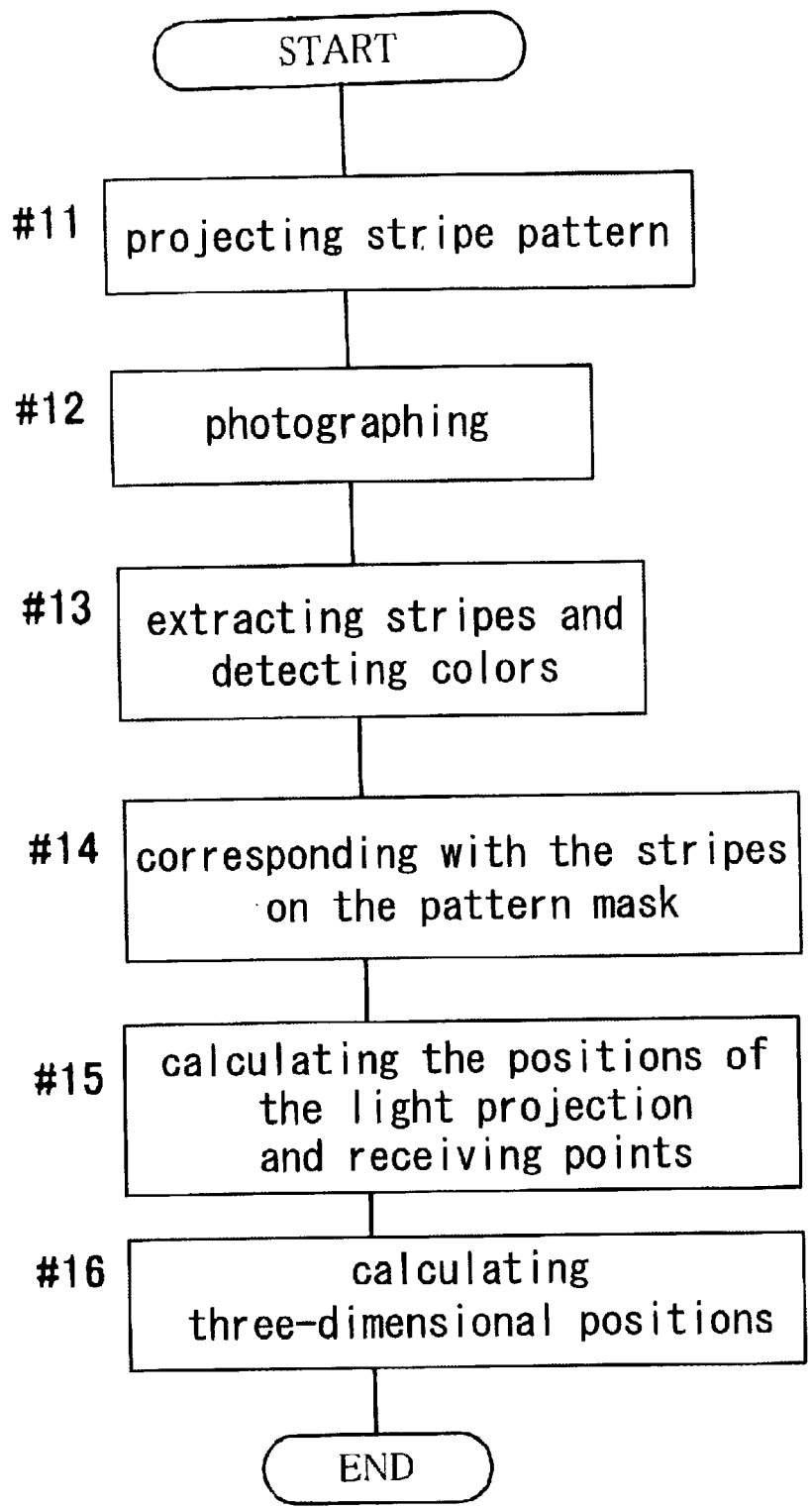
FIG. 9 is a flowchart showing a flow of the process of a three-dimensional measuring method.

FIG. 9 is a flowchart showing the flow of the process of the three-dimensional measuring method.

In FIG. 9, the stripe pattern SP on the pattern mask PM is projected on the object Q in the projection section 3 (#11). In this state, the object Q is photographed by the image pick-up section 4 (#12). Stripes are extracted from the obtained stripe pattern image FGS, and barycentric positions GS of the stripes and coordinates and colors of the barycentric position points Pare detected (#13). The color arrangement of the predetermined number of stripes is compared with the color pattern, so that correspondence with the stripes on the pattern mask PM is obtained (#14). The positions of the light projection and receiving points are obtained based on the correspondence (#15), and the three-dimensional positions are calculated (#16). The steps after step #13 may be a program to be executed by a computer. In this case, the image obtained at step #12 is transmitted to the computer to be processed on the computer.

In the above example, seven colors composing the stripes using three colors R, G and B as basic colors are determined, and the color arrangement of continuous three stripes is limited. However, basic colors, a number of colors, a number of continuous stripes to which a limit is given and the like can be changed variously. Moreover, the correspondence of stripes maybe made from a color arrangement (color pattern) of sporadically plural stripes which do not continue. They may be changed into suitable and various structures or values according to a spectral characteristic of a color filter of the light source 11 or the image sensor 22, shape of the object Q and the like.

In addition, the barycentric positions of the stripes are detected, but the present invention is not limited to this. For example, an edge position of the stripe pattern, an inflection point position of rising or falling, and the like may be detected as long as the positions of the stripes on the image sensor 22 can be made to correspond to the positions on the pattern mask PM.

The 210 stripes compose the stripe pattern SP, but the 210 stripes make one group, and a plurality of the groups are arranged, so that the stripe pattern SP composed of a larger number of stripes may be constituted. In this case, the colors of the respective stripes are set so that the same color pattern composed of a predetermined number of stripes is not repeated in one group.

In addition, a single plate-type color image sensor may be used as the image sensor 22, and a plurality of image sensors may compose the image pick-up section 4.

Second Embodiment

In the first embodiment, arbitrary colors selected from the seven colors are combined, but in the second embodiment arbitrary colors selected from five colors G, C, M, Y and W with a large light quantity are combined. The structure of the second embodiment is the same as that in the first embodiment except that the seven colors are changed into five colors.

Figure 11:
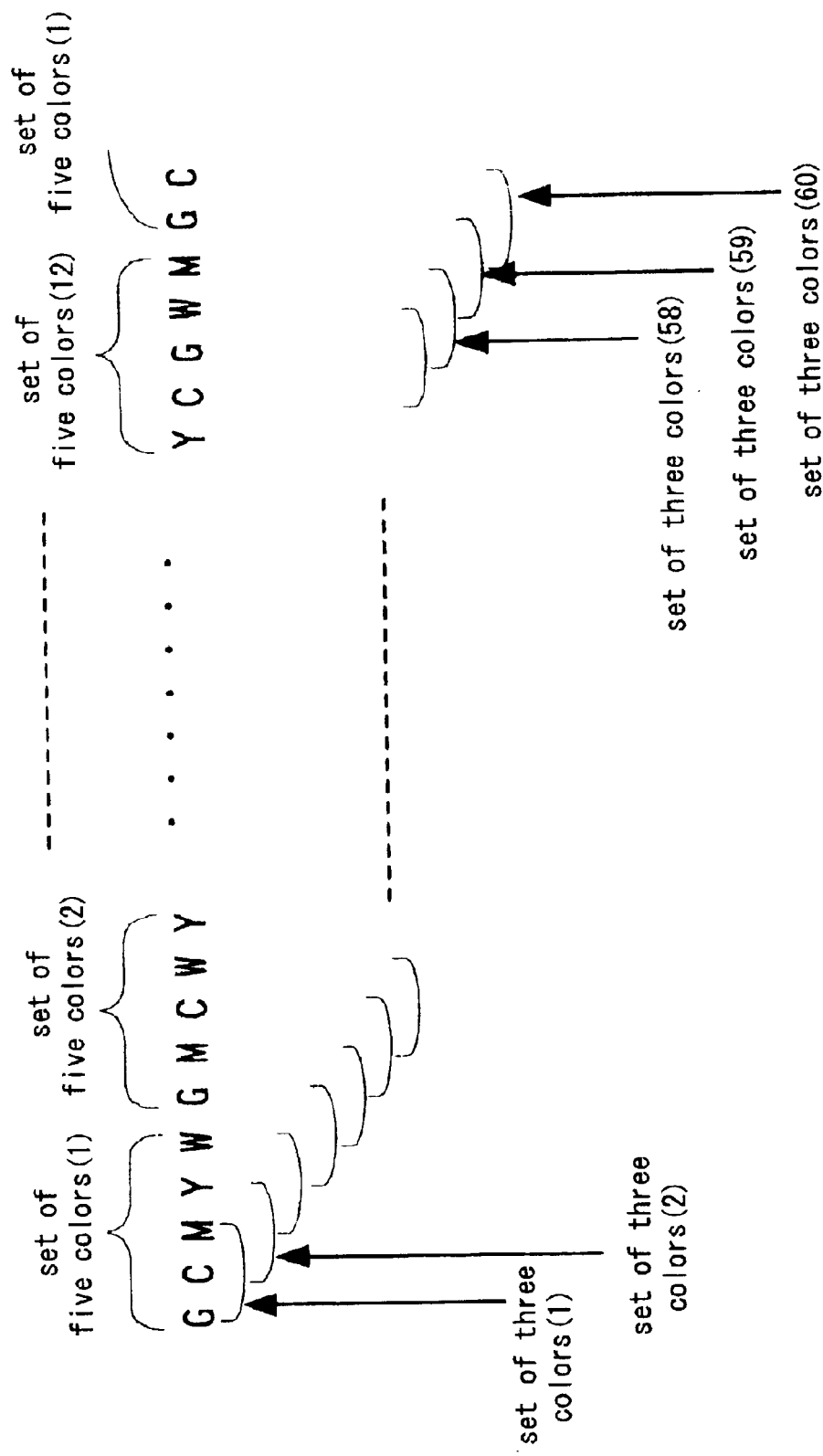
FIG. 11 is a diagram showing an example of a color arrangement of the stripe pattern according to a second embodiment.
Figure 12:
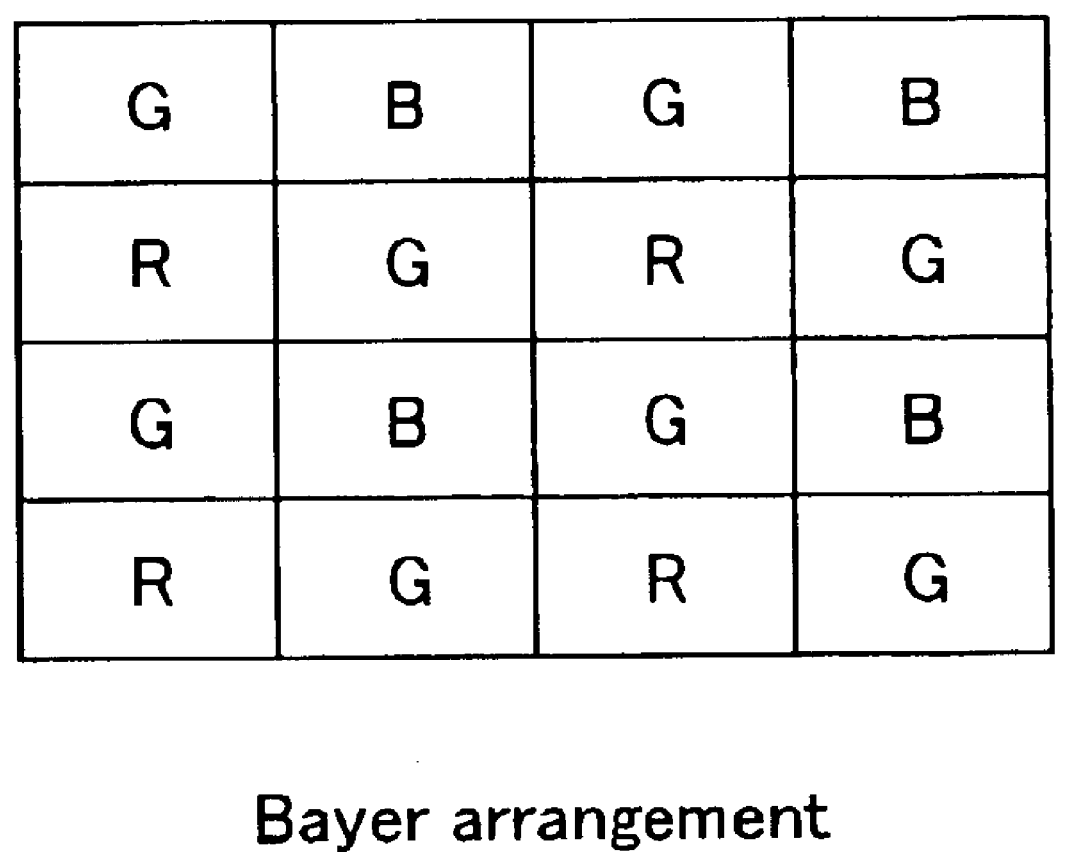

FIG. 10 is a diagram showing a light quantity ratio of seven colors, FIG. 11 is a diagram showing an example of a color arrangement of the stripe pattern SP in the second embodiment, and FIG. 12 is a diagram showing a Bayer arrangement.

As shown in FIG. 12, in the color image sensor where primary color filters are Bayer-arranged, a ratio of pixel numbers of each pixel of R, G and B is 1:2:1. In the case where light quantities of the RGB components as the basic colors composing the respective stripes are the same, the stripes having the G component have a large light quantity and a signal with high level can be obtained from the image sensor. Moreover, a stripe having a color obtained by adding the respective components C, M, Y and W obtains a signal with higher level in comparison with a stripe having a color of single color R, G and B. As the signal level is higher, S/N of the stripe pattern image FGS becomes higher, and the detecting accuracy of the stripe positions is heightened. Therefore, the measuring accuracy of the three-dimensional shape is heightened.

As shown in FIG. 10, a light quantity ratio of R and B is "1", and this is 1/4 of "4" of W. Namely, as for the seven colors, a maximum and minimum ratio in sensibility is 1:4. Therefore, R and B with low signal level are excluded and five colors G, C, M, Y and W with high signal level are used so that the sensibility ratio becomes within 1:2.

As shown in FIG. 11, a number of arrangements in the case where arbitrary three colors are taken out from the five colors is 60 (=5×4×3). 12 sets of stripes where each set has five colored stripes, namely, 60 stripes in total are arranged and a color arrangement in each set is devised. Namely, the 60 arrangements of three-colored stripes are devised so that while the colors are shifted one by one so that the 60 stripes are suitably arranged, and continuous three stripes which have the same color appear only once.

According to the second embodiment, a usable efficiency of lights composing the stripe pattern is improved further than the first embodiment. However, a repeating cycle of the stripe pattern becomes short.

Third Embodiment

In the third embodiment, arbitrary colors selected from four colors G, C, Y and W including the G component are combined. The structure here is the same as that in the first embodiment except that the seven colors are changed into the four colors.

Figure 14:
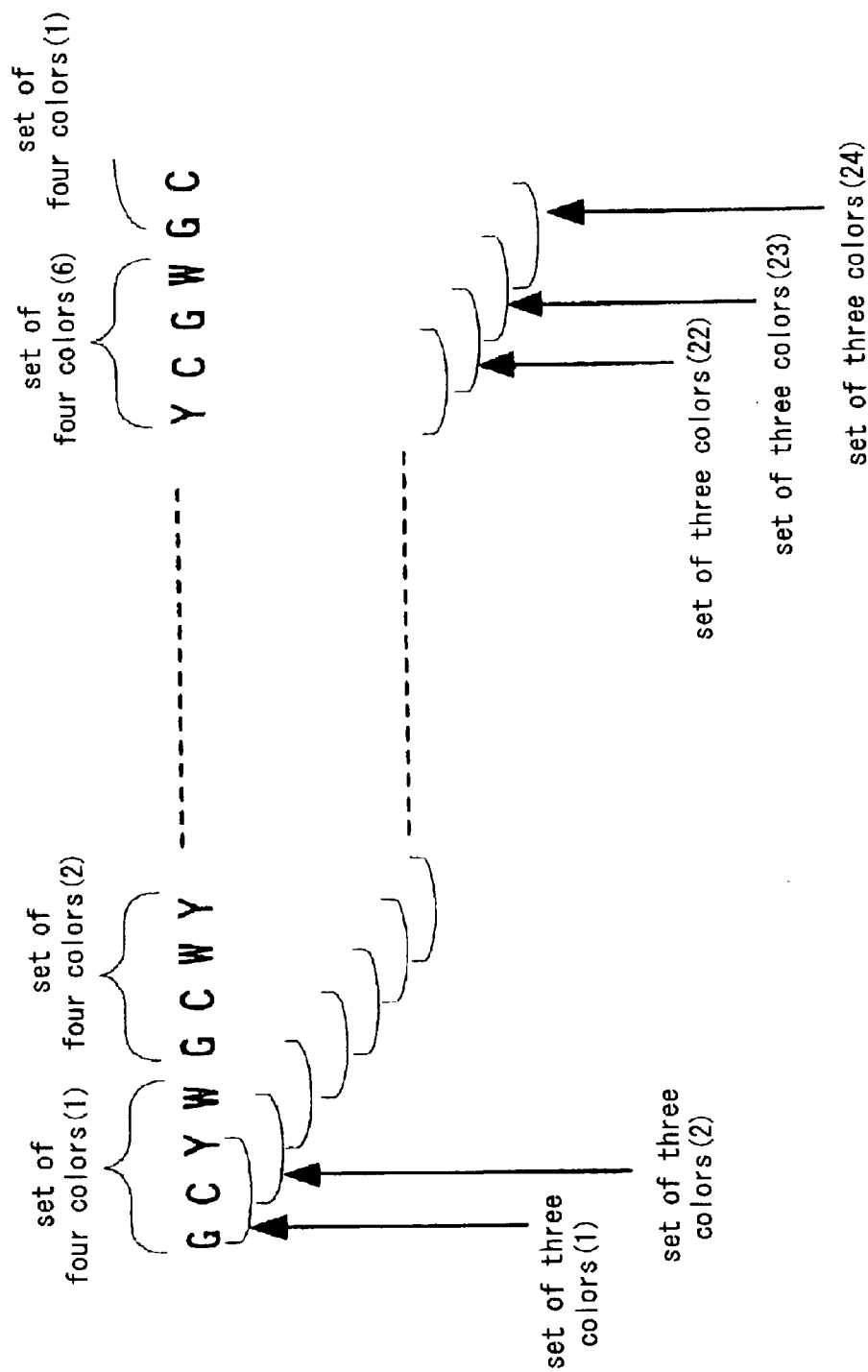
FIG. 14 is a diagram showing an example of a color arrangement of the stripe pattern according to a third embodiment.

FIG. 13 is a diagram showing existence/non-existence of the G component in the seven colors, and FIG. 14 is a diagram showing an example of the color arrangement of the stripe pattern SP in the third embodiment.

As mentioned above, in the image sensor where colors are Bayer-arranged, a pixel number ratio of the RGB pixels is 1:2:1. Moreover, as the pixel density is higher, the measuring accuracy of the stripe positions becomes higher. The stripes having the G component is advantageous because spacial resolution of the image sensor is high.

In order to utilize a light quantity effectively and use the spacial resolution of the image sensor in excelsis, it is ideally desirable that white and black or green and black patterns are repeated. However, it is difficult to make the positions of the stripes photographed on the image sensor correspond to the positions of the stripes on the pattern mask PM only this repetition of the pattern. Therefore, while a light quantity is used as effectively as possible, the arrangement (coding) of the stripe positions is carried out.

As shown in FIG. 13, four colors including the G components in the seven colors are G, C, Y and W. The four colors are used.

As shown in FIG. 14, a number of the arrangements in the case where arbitrary three colors are taken out from the four colors is 24 (=4×3×2). 6 sets of stripes where each set has four colored stripes, namely, 24 stripes in total are arranged and a color arrangement in each set is devised. Namely, the 24 arrangements of three-colored stripes are devised so that while the colors are shifted one by one so that the 24 stripes are suitably arranged, and continuous three stripes which have the same color appear only once.

According to the third embodiment, a usable efficiency of lights composing the stripe pattern is improved further than that of the first embodiment. Moreover, the spacial resolution of the detection in the stripe position becomes high. In the third embodiment, a number of the arrangements is 24, and absolute correspondence of the 24 stripes is made. Therefore, 24 stripes make one group, and a plurality of the groups are arranged, so that the stripe pattern SP made of a larger number of stripes can be constituted. In order to discriminate the groups, various methods such as provision of a counter for counting the groups may be adopted.

In the above embodiments, the projection section 3, the image pick-up section 4, the entire three-dimensional measuring device 1, or structure, shape, dimension, number, material and the like of the respective parts can be changed suitably according to the gist of the present invention.

As mentioned above, according to the present invention, while the measuring accuracy and high speed are maintained, the three-dimensional shape of an object can be reproduced accurately.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A three-dimensional measuring method of projecting a stripe pattern having colored stripes on an object and measuring a three-dimensional shape of the object based on positions of the stripes on the imaged image corresponding to the stripes on the stripe pattern, each colored stripe on the stripe pattern consisting of one common color throughout an entire extent of the stripe, said method comprising the steps of:

setting the colors of the stripes on the stripe pattern according to a predetermined rule;

extracting a plurality of stripes having a predetermined positional relationship from the image, and calculating correspondence between the stripes on the imaged image and the stripes on the stripe pattern based on a color arrangement of the extracted plural stripes.

2. A three-dimensional measuring method of projecting a stripe pattern having colored stripes on an object and measuring a three-dimensional shape of the object based on positions of the stripes on the imaged image corresponding to the stripes on the stripe pattern, each colored stripe on the stripe pattern consisting of one common color throughout an entire extent of the stripe, said method comprising the steps of:

setting the colors of the stripes so that the same color pattern made of a plural predetermined number of stripes is not repeated in a group composed of all or some of the stripes included in the stripe pattern;

extracting a predetermined number of stripes from the image, and calculating correspondence between the stripes on the imaged image and the stripes on the stripe pattern based on a color pattern composed of the extracted stripes.

3. A three-dimensional measuring method according to claim 2, wherein the image is taken by a color image sensor and the colors of the stripes are colors which can be reproduced by combining three primary colors of the color image sensor.

4. A three-dimensional measuring method according to claim 3, wherein the colors of the stripes are five colors: green; cyan; magenta; yellow; and white.

5. A three-dimensional measuring method according to claim 3, wherein the colors of the stripes are colors including a color as a component having the highest pixel density of the color image sensor.

6. A three-dimensional measuring method according to claim 2, wherein the color pattern is formed by three stripes which are arranged continuously.

7. A three-dimensional measuring apparatus comprising:

a projector for projecting a stripe pattern having colored stripes on an object, said colors of the stripes on the stripe pattern are set so that the same color pattern composed of a predetermined number of stripes is not repeated in a group composed of all or some of the stripes included in the stripe pattern;

a storage device for storing information about the color pattern;

an image pick-up device for taking a image of the projected stripe pattern;

an extractor for extracting a predetermined number of stripes from the image;

a corresponding device for referring to the color pattern stored in the storage device and obtaining correspondence with the stripes on the stripe pattern based on a predetermined number of the extracted stripes, and a calculator for calculating a three-dimensional shape of the object based on positions of the stripes on the imaged image corresponding to the stripes on the stripe pattern.

8. A three-dimensional measuring apparatus projecting a stripe pattern having colored stripes on an object and measuring a three-dimensional shape of the object based on positions of the stripes on the imaged image corresponding to the stripes on the stripe pattern, wherein the colors of the stripes on the stripe pattern are set so that the same color pattern composed of a predetermined number of stripes is not repeated in a group composed of all or some of the stripes included in the stripe pattern, said apparatus comprising:

a color image sensor which is capable of discriminating the colors, and an image pick-up device which has a color image sensor being capable of discriminating the color and for taking an image of the object on which the stripe pattern has been projected.

9. A three-dimensional measuring apparatus according to claim 8, wherein the colors of the stripes are colors which can be reproduced by combining three primary colors of the color image sensor.

10. A three-dimensional measuring apparatus according to claim 9, wherein the colors of the stripes are five colors: green; cyan; magenta; yellow; and white.

11. A three-dimensional measuring apparatus according to claim 9, wherein the colors of the stripes are colors including a color as a component having the highest pixel density of the color image sensor.

12. A three-dimensional measuring apparatus according to claim 8, wherein the color pattern is formed by three stripes which are arranged continuously.

13. A stripe pattern apparatus comprising:

a stripe pattern forming device for forming a stripe pattern having colored stripes, each colored stripe on the stripe pattern consisting of one common color throughout an entire extent of the stripe, and projector for projecting the stripe pattern on an object for measuring a three-dimensional shape of the object based on positions of the stripes on the imaged image corresponding to the stripes on the stripe pattern, wherein the colors of the stripes in the stripe pattern formed in the stripe pattern forming device are set so that the same color pattern composed of a predetermined number of stripes is not repeated in a group composed of all or some of the stripes.

14. A computer program product for projecting a stripe pattern where each colored stripe on the stripe pattern consists of one common color throughout an entire extent of the stripe, colors of stripes are set so that the same color pattern having a predetermined number of stripes is not repeated onto an object and measuring a three-dimensional shape of the object based on positions of the stripes on the imaged image, the computer program product being embodied in a computer readable medium and comprising computer instructions for:

extracting a predetermined number of stripes from the image;

referring to information about the color pattern, and obtaining correspondence between the extracted stripes and stripes on the stripe pattern based on the color pattern composed of a predetermined number of the extracted stripes.

* * * * *